US012689526B2

(12) United States Patent
Zahradka et al.

(10) Patent No.: US 12,689,526 B2
(45) Date of Patent: Jul. 21, 2026

(54) AUTOMATIC DIGITAL CERTIFICATE REQUEST WITH SOFTWARE DEPLOYMENT

(71) Applicant: Target Brands, Inc., Minneapolis, MN (US)

(72) Inventors: Trey J. Zahradka, Blaine, MN (US); Jeffrey M. Colfer, Raleigh, NC (US); Aaron J. Zirbes, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 121 days.

(21) Appl. No.: 18/440,352

(22) Filed: Feb. 13, 2024

(65) Prior Publication Data

US 2025/0260583 A1    Aug. 14, 2025

(51) Int. Cl.
| | |
|---|---|
| *H04L 9/32* | (2006.01) |
| *G06F 8/60* | (2018.01) |
| *H04L 9/30* | (2006.01) |

(52) U.S. Cl.
CPC .............. *H04L 9/3263* (2013.01); *G06F 8/60* (2013.01); *H04L 9/30* (2013.01)

(58) Field of Classification Search
CPC ............ H04L 9/3263; H04L 9/30; G06F 8/60
See application file for complete search history.

(56) References Cited

U.S. PATENT DOCUMENTS

| | | | |
|---|---|---|---|
| 7,650,497 B2 | 1/2010 | Thornton et al. | |
| 8,327,128 B1 * | 12/2012 | Prince ................ | H04L 63/0884 |
| | | | 713/153 |
| 8,738,901 B2 | 5/2014 | Fu et al. | |
| 9,130,758 B2 | 9/2015 | Fu et al. | |
| 9,614,833 B1 * | 4/2017 | Rao ..................... | H04L 63/0823 |
| 11,206,142 B2 | 12/2021 | Goeringer et al. | |
| 11,323,274 B1 * | 5/2022 | Bowen .................. | H04L 9/3268 |
| 2005/0069136 A1 * | 3/2005 | Thornton ................ | H04L 63/20 |
| | | | 380/277 |
| 2011/0126001 A1 * | 5/2011 | Fu ........................... | H04L 63/06 |
| | | | 713/156 |

(Continued)

OTHER PUBLICATIONS

Aas et al., Let's Encrypt: An Automated Certificate Authority to Encrypt the Entire Web, Proceedings of the 2019 Acm Sigsac Conference on Computer and Communications Security, Retrieved at https://dl.acm.org/doi/ pdf/10.1145/3319535.3363192, pp. 2473-2487, 2019.

(Continued)

*Primary Examiner* — Darshan I Dhruv

(74) *Attorney, Agent, or Firm* — Theodore M. Magee; Westman, Champlin & Koehler, P.A.

(57)    ABSTRACT

A system includes a deployment server configured to receive an instruction to deploy software from an entity and in response to the instruction to deploy software, calling an application interface to request a new cryptographic certificate. An application server is configured to execute the application interface to receive the request for the new cryptographic certificate and in response to the request, obtain the new cryptographic certificate. A secure digital vault is configured to receive the new cryptographic certificate wherein the entity is not allowed to access the secure digital vault.

12 Claims, 6 Drawing Sheets

(56) References Cited

U.S. PATENT DOCUMENTS

| | | | |
|---|---|---|---|
| 2011/0161662 A1* | 6/2011 | Lee | H04L 63/20 713/168 |
| 2014/0189847 A1* | 7/2014 | Shen | H04L 63/0272 726/15 |
| 2015/0052351 A1* | 2/2015 | Nodehi Fard Haghighi | H04L 63/0428 713/156 |
| 2015/0089232 A1* | 3/2015 | Belton | H04L 9/3268 713/175 |
| 2015/0256345 A1* | 9/2015 | Vaid | H04L 9/3268 713/158 |
| 2018/0034646 A1* | 2/2018 | Kuramoto | H04L 9/3268 |
| 2020/0059372 A1* | 2/2020 | Goeringer | H04L 9/007 |
| 2021/0021585 A1* | 1/2021 | Rahman | H04L 63/0823 |
| 2021/0247731 A1* | 8/2021 | Poluri | G05B 19/042 |
| 2021/0288822 A1* | 9/2021 | Sorensen | H04L 9/0877 |

OTHER PUBLICATIONS

Topalovic et al., Towards Short-Lived Certificates, Stanford University, Carnegie Mellon University, Retrieved at https:// cseweb. ucsd.edu/~dstefan/cse127-winter19/papers/topalovic:towards.pdf, 9 p. 2012.

* cited by examiner

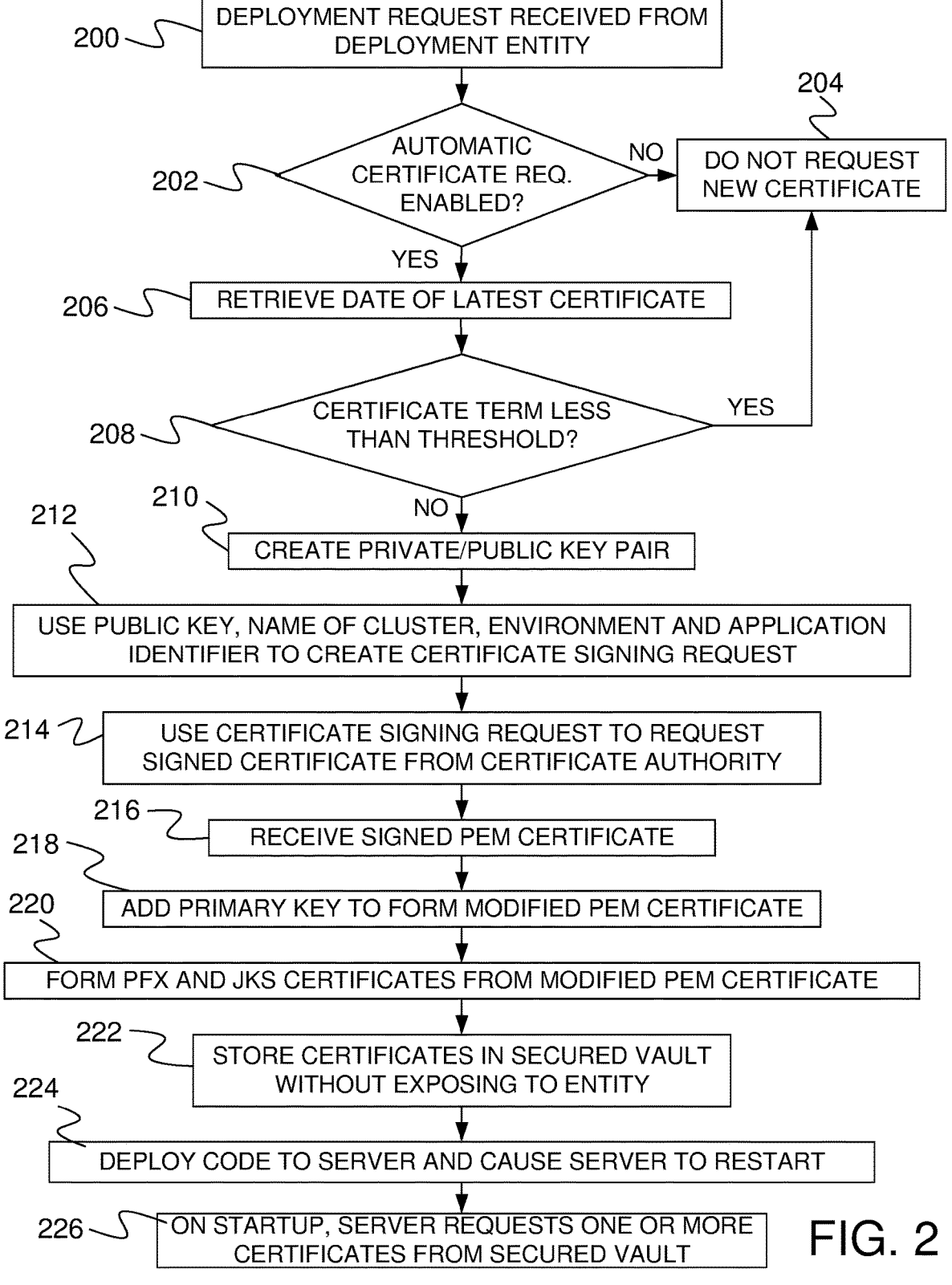

200 — DEPLOYMENT REQUEST RECEIVED FROM DEPLOYMENT ENTITY

202 — AUTOMATIC CERTIFICATE REQ. ENABLED?

NO

204 — DO NOT REQUEST NEW CERTIFICATE

YES

206 — RETRIEVE DATE OF LATEST CERTIFICATE

208 — CERTIFICATE TERM LESS THAN THRESHOLD?

YES

NO

210 — CREATE PRIVATE/PUBLIC KEY PAIR

212 — USE PUBLIC KEY, NAME OF CLUSTER, ENVIRONMENT AND APPLICATION IDENTIFIER TO CREATE CERTIFICATE SIGNING REQUEST

214 — USE CERTIFICATE SIGNING REQUEST TO REQUEST SIGNED CERTIFICATE FROM CERTIFICATE AUTHORITY

216 — RECEIVE SIGNED PEM CERTIFICATE

218 — ADD PRIMARY KEY TO FORM MODIFIED PEM CERTIFICATE

220 — FORM PFX AND JKS CERTIFICATES FROM MODIFIED PEM CERTIFICATE

222 — STORE CERTIFICATES IN SECURED VAULT WITHOUT EXPOSING TO ENTITY

224 — DEPLOY CODE TO SERVER AND CAUSE SERVER TO RESTART

226 — ON STARTUP, SERVER REQUESTS ONE OR MORE CERTIFICATES FROM SECURED VAULT

```
Certificate Request:
  Data:
    Version: 1 (0x0)
    Subject: C = <PresetCountry>, ST = <PresetState>, L = <PresetCity>,
             O = <PresetOrginizationName>, OU = <PresetOrgUnit>,
             CN = <clustername>.<env>.<PresetDomain>,
             EMAIL=<PresetEmailAddress>
    Subject Public Key Info:
      Public Key Algorithm: rsaEncryption
        RSA Public-Key: (2048 bit)
        Modulus:
          00:f3:e4:e8:ed:df:b6:90:f5:9e:06:ff:e8:ad:4d:
          cb:55:b2:70:0e:b4:90:6d:e2:9a:98:29:a8:c2:9e:
          5b:a8:3c:48:c1:5d:b4:ce:a4:5b:ec:03:d4:38:a6:
          28:54:41:45:38:44:2c:e9:3e:a0:22:69:c8:a2:58:
          5b:88:7e:a6:e3:38:19:fc:23:ef:58:13:a4:65:cf:
          9c:d4:fa:36:12:6b:c1:cf:e0:03:e6:c0:5d:4f:99:
          33:19:00:3a:35:b5:b2:64:69:5d:c5:1b:61:34:b3:
          ac:d5:e7:ce:85:d9:d6:16:e8:48:d7:ad:aa:99:c7:
          e5:82:98:88:58:3b:b0:ab:80:bd:7f:e6:24:78:98:
          4d:9f:d7:45:e7:ea:30:9b:c7:0e:42:60:eb:57:c3:
          4d:76:24:ea:8a:7f:2a:de:a6:00:1c:72:51:5b:6f:
          20:94:95:02:66:44:d9:c0:86:92:47:a7:2b:05:0f:
          13:6d:83:44:d1:d7:3e:09:a6:b7:0c:e2:24:cf:51:
          0e:b0:75:b3:4f:1f:a7:d3:32:9f:a9:c6:e0:5e:2e:
          03:27:1f:82:d5:b8:e9:b5:83:d1:04:f6:4b:f0:30:
          1e:5a:e0:3c:79:bb:9d:55:3e:38:c8:4a:7c:d8:6f:
          7a:fc:68:1c:7f:b1:77:df:13:31:7b:4c:9c:f9:76:
          ba:a3
        Exponent: 65537 (0x10001)
```

-----BEGIN CERTIFICATE-----
MIIEczCCA1ugAwIBAgIBADANBgkqhkiG9w0BAQQFAD..AkGA1UEBhMCR0Ix
EzARBgNVBAgTCINvbWUtU3RhdGUxFDASBgNVBAoTC0..0EgTHRkMTcwNQYD
VQQLEy5DbGFzcyAxIFB1YmxpYyBQcmltYXJ5IENIcn..XRpb24gQXV0aG9y
aXR5MRQwEgYDVQQDEwtCZXN0IENBIEx0ZDAeFw0wMD..TUwMTZaFw0wMTAy
MDQxOTUwMTZaMIGHMQswCQYDVQQGEwJHQjETMBEGA1..29tZS1TdGF0ZTEU
MBIGA1UEChMLQmVzdCBDQSBMdGQxNzA1BgNVBAsTLk..DEgUHVibGljIFBy
aW1hcnkgQ2VydGImaWNhdGlvbiBBdXRob3JpdHkxFD..AMTC0Jlc3QgQ0Eg
THRkMIIBIjANBgkqhkiG9w0BAQEFAAOCAQ8AMIIBCg..Tz2mr7SZiAMfQyu
vBjM9OiJjRazXBZ1BjP5CE/Wm/Rr500PRK+Lh9x5eJ../ANBE0sTK0ZsDGM
ak2m1g7orul3dY3VHqIxFTz0Ta1d+NAjwnLe4nOb7/..k05ShhBrJGBKKxb
8n104o/5p8HAsZPdzbFMIyNjJzBM2o5y5A13wiLitE..fyYkQzaxCw0Awzl
kVHilyCuaF4wj571pSzkv6sv+4IDMbT/XpCo8L6wTa..sh+etLD6FtTjYbb
rvZ8RQM1tIKdoMHg2qxraAV++HNBYmNWs0duEdjUbJ..XI9TtnS4o1Ckj7P
OfljiQIDAQABo4HnMIHkMB0GA1UdDgQWBBQ8urMCRL..5AkIp9NJHJw5TCB
tAYDVR0jBIGsMIGpgBQ8urMCRLYYMHUKU5AkIp9NJH..aSBijCBhzELMAkG
A1UEBhMCR0IxEzARBgNVBAgTCINvbWUtU3RhdGUxFD..AoTC0Jlc3QgQ0Eg
THRkMTcwNQYDVQQLEy5DbGFzcyAxIFB1YmxpYyBQcm..ENIcnRpZmIjYXRp
b24gQXV0aG9yaXR5MRQwEgYDVQQDEwtCZXN0IENBIE..DAMBgNVHRMEBTAD
AQH/MA0GCSqGSIb3DQEBBAUAA4IBAQC1uYBcsSncwA..DCsQer772C2ucpX
xQUE/C0pWWm6gDkwd5D0DSMDJRqV/weoZ4wC6B73f5..bLhGYHaXJeSD6Kr
XcoOwLdSaGmJYsILKZB3ZIDEp0wYTGhgteb6JFiTtn..sf2xdrYfPCiIB7g
BMAV7Gzdc4VspS6IjrAhbiiawdBiQIQmsBeFz9JkF4..b3I8BoGN+qMa56Y
It8una2gY4I2O//on88r5IWJIm1L0oA8e4fR2yrBHX..adsGeFKkyNrwGi/
7vQMfXdGsRrXNGRGnX+vWDZ3/zWI0joDtCkNnqEpVn..HoX
-----END CERTIFICATE-----

-----BEGIN  PRIVATE KEY-----

MIGEAgEAMBAGByqGSM49AgEGBSuBBAAKBG0wawIBAQQgVcB/UNPxaIR9zDYAjQIf
jojUDiQuGnSJrFEEzZPT/92hRANCAASc7UJtgnF/abqWM60T3XNJEzBv5ez9TdwK
H0M6xpM2q+53wmsN/eYLdgtjgBd3DBmHtPiICkiFICXyaA8z9LkJ

-----END PRIVATE KEY-----  506

402

404

-----BEGIN CERTIFICATE-----
MIIEczCCA1ugAwIBAgIBADANBgkqhkiG9w0BAQQFAD..AkGA1UEBhMCR0Ix
EzARBgNVBAgTCINvbWUtU3RhdGUxFDASBgNVBAoTC0..0EgTHRkMTcwNQYD
VQQLEy5DbGFzcyAxIFB1YmxpYyBQcmItYXJ5IENIcn..XRpb24gQXV0aG9y
aXR5MRQwEgYDVQQDEwtCZXN0IENBIEx0ZDAeFw0wMD..TUwMTZaFw0wMTAy
MDQxOTUwMTZaMIGHMQswCQYDVQQGEwJHQjETMBEGA1..29tZS1TdGF0ZTEU
MBIGA1UEChMLQmVzdCBDQSBMdGQxNzA1BgNVBAsTLk..DEgUHVibGljIFBy
aW1hcnkgQ2VydGImaWNhdGlvbiBBdXRob3JpdHkxFD..AMTC0Jlc3QgQ0Eg
THRkMIIBIjANBgkqhkiG9w0BAQEFAAOCAQ8AMIIBCg..Tz2mr7SZiAMfQyu
vBjM9OiJjRazXBZ1BjP5CE/Wm/Rr500PRK+Lh9x5eJ../ANBE0sTK0ZsDGM
ak2m1g7oruI3dY3VHqIxFTz0Ta1d+NAjwnLe4nOb7/..k05ShhBrJGBKKxb
8n104o/5p8HAsZPdzbFMIyNjJzBM2o5y5A13wiLitE..fyYkQzaxCw0Awzl
kVHilyCuaF4wj571pSzkv6sv+4IDMbT/XpCo8L6wTa..sh+etLD6FtTjYbb
rvZ8RQM1tIKdoMHg2qxraAV++HNBYmNWs0duEdjUbJ..XI9TtnS4o1Ckj7P
OfljiQIDAQABo4HnMIHkMB0GA1UdDgQWBBQ8urMCRL..5AkIp9NJHJw5TCB
tAYDVR0jBIGsMIGpgBQ8urMCRLYYMHUKU5AkIp9NJH..aSBijCBhzELMAkG
A1UEBhMCR0IxEzARBgNVBAgTCINvbWUtU3RhdGUxFD..AoTC0Jlc3QgQ0Eg
THRkMTcwNQYDVQQLEy5DbGFzcyAxIFB1YmxpYyBQcm..ENIcnRpZmljYXRp
b24gQXV0aG9yaXR5MRQwEgYDVQQDEwtCZXN0IENBIE..DAMBgNVHRMEBTAD
AQH/MA0GCSqGSIb3DQEBBAUAA4IBAQC1uYBcsSncwA..DCsQer772C2ucpX
xQUE/C0pWWm6gDkwd5D0DSMDJRqV/weoZ4wC6B73f5..bLhGYHaXJeSD6Kr
XcoOwLdSaGmJYsILKZB3ZIDEp0wYTGhgteb6JFiTtn..sf2xdrYfPCiIB7g
BMAV7Gzdc4VspS6ljrAhbiiawdBiQIQmsBeFz9JkF4..b3I8BoGN+qMa56Y
It8una2gY4I2O//on88r5IWJlm1L0oA8e4fR2yrBHX..adsGeFKkyNrwGi/
7vQMfXdGsRrXNGRGnX+vWDZ3/zWI0joDtCkNnqEpVn..HoX
-----END CERTIFICATE-----

AUTOMATIC DIGITAL CERTIFICATE REQUEST WITH SOFTWARE DEPLOYMENT

BACKGROUND

In asymmetric cryptography, an encryption algorithm applies data and an encryption key to a one-way function to produce encrypted data. A corresponding decryption algorithm applies the encrypted data and a decryption key to a second function to obtain the original data. The encryption key is made publicly available while the decryption key is kept secret. This allows anyone with the encryption key to encrypt data while only someone who has the secret decryption key can decrypt the data.

The encryption key is referred to as the public key and the decryption key is referred to as the private key. To use asymmetric cryptography, a first computer creates a public key/private key pair and then shares the public key while keeping the private key secret. If a second computer wants to send encrypted messages to the first computer, the second computer uses the public key to encrypt the message and then sends the encrypted message to the first computer. The first computer then uses the private key to decrypt the message.

One way to defeat asymmetric cryptography is to impersonate a server that a client wants to send encrypted information to. For example, a server can claim that it is a website www.spoof.net when it actually is not. The impersonating server then creates a public key/private key pair and sends the public key to unsuspecting client computers. The client computers use the public key to encrypt sensitive data and then send the encrypted data to the impersonating server. Since the impersonating server has the correct private key, the impersonating server is able to decrypt the sensitive data.

To prevent such spoofing, the Public Key Infrastructure (PKI) was created. Under this scheme, Certification Authorities certify that a public key is associated with a particular identity. To do this, Certificate Authorities issue a signed digital certificate, also known as a public key certificate or cryptographic certificate, that links a public key to an identity such as a hostname. When a client receives a signed digital certificate, the client verifies that the certificate was signed by a qualified certification authority and then assumes that the public key in the certificate is linked to the identity in the certificate.

The discussion above is merely provided for general background information and is not intended to be used as an aid in determining the scope of the claimed subject matter. The claimed subject matter is not limited to implementations that solve any or all disadvantages noted in the background.

SUMMARY

A method includes receiving an instruction to deploy software to a server and in response to the instruction, automatically requesting a new cryptographic certificate for the server.

In accordance with a further embodiment, a system includes a deployment server configured to receive an instruction to deploy software from an entity and in response to the instruction to deploy software, calling an application interface to request a new cryptographic certificate. An application server is configured to execute the application interface to receive the request for the new cryptographic certificate and in response to the request, obtain the new cryptographic certificate. A secure digital vault is configured to receive the new cryptographic certificate wherein the entity is not allowed to access the secure digital vault.

In a still further embodiment, a method includes receiving a request for a cryptographic certificate from a deployment server, wherein the deployment server is configured to deploy software to an application server in response to an instruction from an entity. The cryptographic certificate is generated and is stored in a secure digital vault that is accessible to the application server without exposing the cryptographic certificate to the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a flow diagram of a method in accordance with one embodiment.

FIG. 3 is an example of a Certificate Signing Request.

FIG. 4 is an example of a PEM certificate without a private key.

FIG. 5 is an example of a PEM certificate with a private key.

DETAILED DESCRIPTION

Most cryptographic certificates, such as certificates under the X.509 standard, include an expiration date after which they are no longer valid. As a result, engineers responsible for maintaining a server must request a new certificate before the old certificate expires. Typically, this involves obtaining a public key/private key pair, using the public key to create a certificate signing request, sending the certificate signing request to a certificate authority to obtain a new signed certificate and passing the signed certificate and the private key to the server.

Such a system is less than ideal for a number of reasons. First, the system is not secure because the engineer is given access to the private key. This creates the possibility that the engineer will be able to decrypt messages that are sent to the server. Second, the system relies on the engineer remembering to request the certificate before the existing certificate expires. If the engineer forgets or is otherwise unable to request the new certificate, the server will stop functioning because cryptographic communication will no longer be allowed. Third, the system requires that an engineer perform a number of error-prone steps. In large scale environments where an engineer is responsible for a number of servers, this workload can be substantial.

In the embodiments provided below, a software deployment system is provided that automatically requests a new certificate for a server when software is deployed to the server. The system of the embodiments is more secure, more reliable and less labor intensive than prior art methods of keeping cryptographic certificates up to date.

Figure 1:
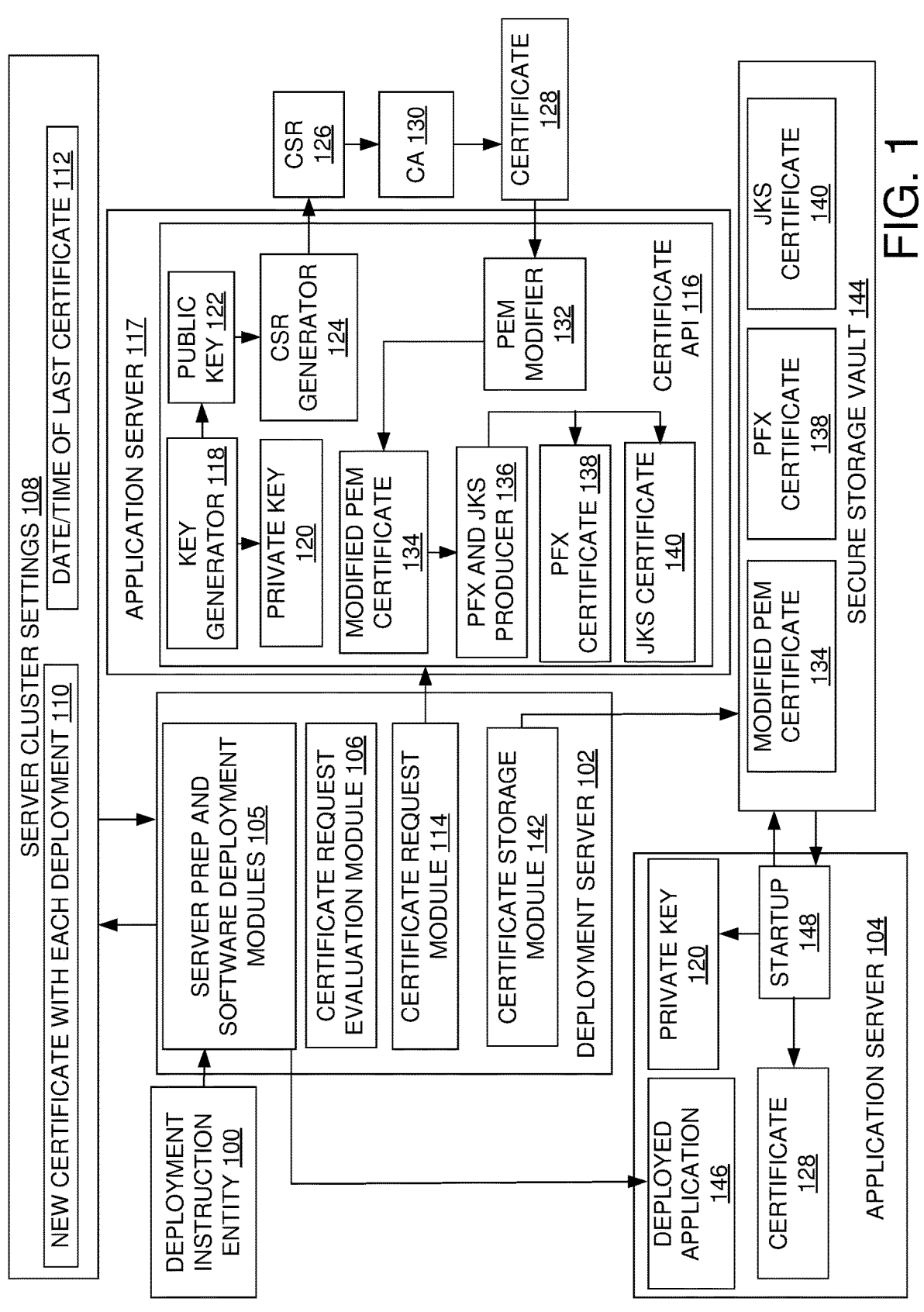
FIG. 1 is a block diagram of a system in accordance with one embodiment.

FIG. 1 provides a block diagram of a system in accordance with one embodiment and FIG. 2 provides a method performed by the system of FIG. 1.

In step 200 of FIG. 2, a deployment instruction entity 100 issues a deployment instruction to a deployment server 102.

In accordance with one embodiment, the deployment instruction entity 100 is an engineer while in other embodiments, deployment instruction entity 100 is a software module.

The deployment instruction directs deployment server 102 to deploy an application or part of an application to an application server 104. In accordance with one embodiment, the server is identified by a server cluster name and an environment (such as development or production) and the application is identified by an application identifier.

In step 202, server preparation and software deployment modules 105 in deployment server 102 executes part of a pipeline associated with deploying code to the identified server. In particular, in step 202, modules 105 call a certificate request evaluation module 106, which determines whether automatic certificate requesting is enabled for the identified server. To make this determination, module 106 examines server cluster settings 108 to see if a New Certificate with Each Deployment setting 110 is set to True for the server cluster name and environment. If setting 110 is set to false, no new certificate is requested and the process of FIG. 2 ends at step 204.

If setting 110 is set to true at step 202, the last date and time 112 that a certificate was requested for the server cluster and environment is retrieved from server cluster settings 108 at step 206. The amount of time since the last certificate was requested is compared to a threshold time span at step 208. If the amount of time is less than the threshold span, no new certificate is requested and the process of FIG. 2 ends at step 204. The threshold span is selected as a balance between ensuring that the certificate will expire as late as possible while not wasting resources in obtaining a new certificate that will not extend the life span of the certificate significantly. In accordance with one embodiment, the time span is twenty-four hours.

After certificate request evaluation module 106 has determined that a new certificate should be requested at step 208, server prep modules 105 call a certificate request module 114, which calls a certificate API 116 executed on an application server 117 to request the new certificate.

In step 210, certificate API 116 executes a key generator 118 to generate a private key/public key pair consisting of a private key 120 and a public key 122 that are used together during cryptographic operations. In particular, messages encrypted with the public key can be decrypted using the private key.

At step 212, public key 122 and the name of the cluster server, the environment and the application identifier are used by a CSR generator 124 to generate a certificate signing request.

FIG. 3 provides an example of a decoded Certificate Signing Request 300 formed by CSR generator 124. Certificate Signing Request 300 includes requestor attributes 302 and public key information 304. Requestor attributes 302 include a country designation 306, a state designation 308, a locality designation 310, an organization designation 312, an organizational unit designation 314, a common name designation 316 and an email designation 317. Organization designation 312 provides the legal name of the organization requesting the Digital Certificate. Country designation 306, state designation 308, and locality designation 310 provide the country, state and city of the organization. Organizational unit designation 314 provides an internal name of a unit within the organization that is requesting the Digital Certificate. Common name designation 316 provides the address of the network server that the Digital Certificate is being issued for. Email designation 317 provides an email address to contact with questions about issuing the Digital Certificate.

Public key information 304 includes algorithm designation 318, key length designation 320 and public key modulus and exponent designation 322 (also referred to as simply the public key designation). Algorithm designation 318 indicates the encryption algorithm that will be used during communications with the network server. Key length designation 320 indicates the length of the keys used in the certificate signing algorithm. Public key designation 322 provides the public key to be used during encrypted communications with the network server and consists of a modulus and an exponent.

In accordance with one embodiment, CSR generator 124 generates country designation 306, state designation 308, locality designation 310, organization designation 312, organizational unit designation 314, and email designation 317 using preset values that are the same for each application server that deployment server 102 deploys code to. In other embodiments, one or more of these values may be provided in the call to certificate API server 116. In accordance with one embodiment, common name designation 316 is constructed by CSR generator 124 using the cluster name and environment provided in the call to certificate API server 116 together with a preset domain. In FIG. 3, the common name is set to <clustername>.<environment>.<PresetDomain>. For example, if the PresetDomain is "Target.com", and the cluster name and environment that are passed in are TestCluster and Dev, respectively, the common name would become "TestCluster.Dev.Target.Com."

CSR generator also uses preset values for the encryption algorithm and key length.

At step 214, the generated certificate signing request 126 is used to request a signed certificate 128 from a certificate authority 130. The signed certificate 128 provides assurances that public key 122 is associated with the entity responsible for application server 104. Although certificate signing request 126 is shown being provided directly to certificate authority 130 in FIG. 1, in other embodiments, certificate signing request 126 is provided to an intermediary that selects a certificate authority. The selected certificate authority can be internal to an organization or external to the organization. One selection method is to select a preferred certificate authority set in a configuration file for one of the CSR attributes, such as the organizational unit or the common name, for example. A second selection method is to retrieve prices set in a configuration file for issuing Digital Certificates from the different certificate authorities in a selected collection of certificate authorities and then selecting the certificate authority with the lowest price. A third selection method is to use the limits on the number of Digital Certificates each certificate authority can issue to select the certificate authority. In accordance with one embodiment, the limits are used in conjunction with the number of Digital Certificates previously issued by each certificate authority to determine a number of certificates remaining for each certificate authority.

At step 216, the signed certificate is received from certificate authority 130. In one embodiment, the certificate is in the Privacy Enhanced Mail (PEM) format that includes the certificate but does not include the private key.

FIG. 4 provides an example of a signed PEM certificate 400. Certificate 400 includes the signed certificate 402 in Base-64 encoding between a Begin Certificate header 404 and an End Certificate footer 406. Signed certificate 402 includes the information provided in the Certificate Signing Request as well as a digital signature of the certificate authority. Because the private key is not provided to the certificate authority, PEM certificate 400 does not include the private key. The information in signed certificate 402 can be accessed by decoding signed certificate 402.

At step 218, private key 120 is added to the PEM certificate by a PEM modifier 132 to form a cryptographic file or modified PEM certificate 134. FIG. 5 provides an example 500 of modified PEM certificate 134. Example 500 includes signed certificate 402 between header 404 and footer 406. In addition, example 500 includes Base-64 encoded private key 502 between Begin Private Key header 504 and End Private Key footer 506. Encoded private key 502 includes information about the private key such as the modulus, the public exponent, the private exponent, and the two prime numbers used to form the modulus.

To provide for servers that use other certificate formats, a PFX and JKS producer 136 produces a PFX certificate 138 and a JKS certificate 140 at step 220. PFX certificate 138 is in the Public-Key Cryptography Standards 12 format and includes the public-key certificate 128 and private key 120. JKS certificate 140 is a Java KeyStore that includes public-key certificate 128 and private key 120.

At step 222, certificate API 116 returns modified PEM certificate 134, PFX certificate 138 and JKS certificate 140 to deployment server 102. Certificate storage module 142 in deployment server 102 then stores one or more of modified PEM certificate 134, PFX certificate 138 and JKS certificate 140 in a secure storage vault 144. Which of the returned files are stored and where they are stored in secure storage vault 144 are controlled by settings in server cluster settings 108. After modified PEM certificate 134, PFX certificate 138 and/or JKS certificate 140 are created, they are secured so that deployment instruction entity 100 is not exposed to the certificates or the private key within the certificates. Thus, deployment server 102 stores the one or more certificates in secure storage vault 144 while ensuring that deployment instruction entity 100 does not gain access to the certificates or private key 120. For example, when the deployment instruction entity is an engineer, the engineer is prevented from seeing the certificate or private key.

At step 224, the code that the deployment instruction entity wanted deployed to server 104 is sent to server 104 as deployed application 146. In accordance with one embodiment, server 104 is provided with a path to the application to be deployed and then requests the file at that path location. Although step 224 is shown as occurring after the new digital certificate has been produced, in other embodiments, application 146 is deployed before the new certificate is requested. After application 146 has been deployed to server 104, server 104 is restarted.

At step 226, a startup routine 148 executed by application server 148 requests one of certificates 134, 138, and 140 from secured storage vault 144. Startup routine 148 parses the certificate retrieved from secure storage vault 144 to acquire private key 120 and certificate 128. Application server 104 then provides certificate 128 to clients to allow those clients to communicate securely with application server 104.

Figure 6:
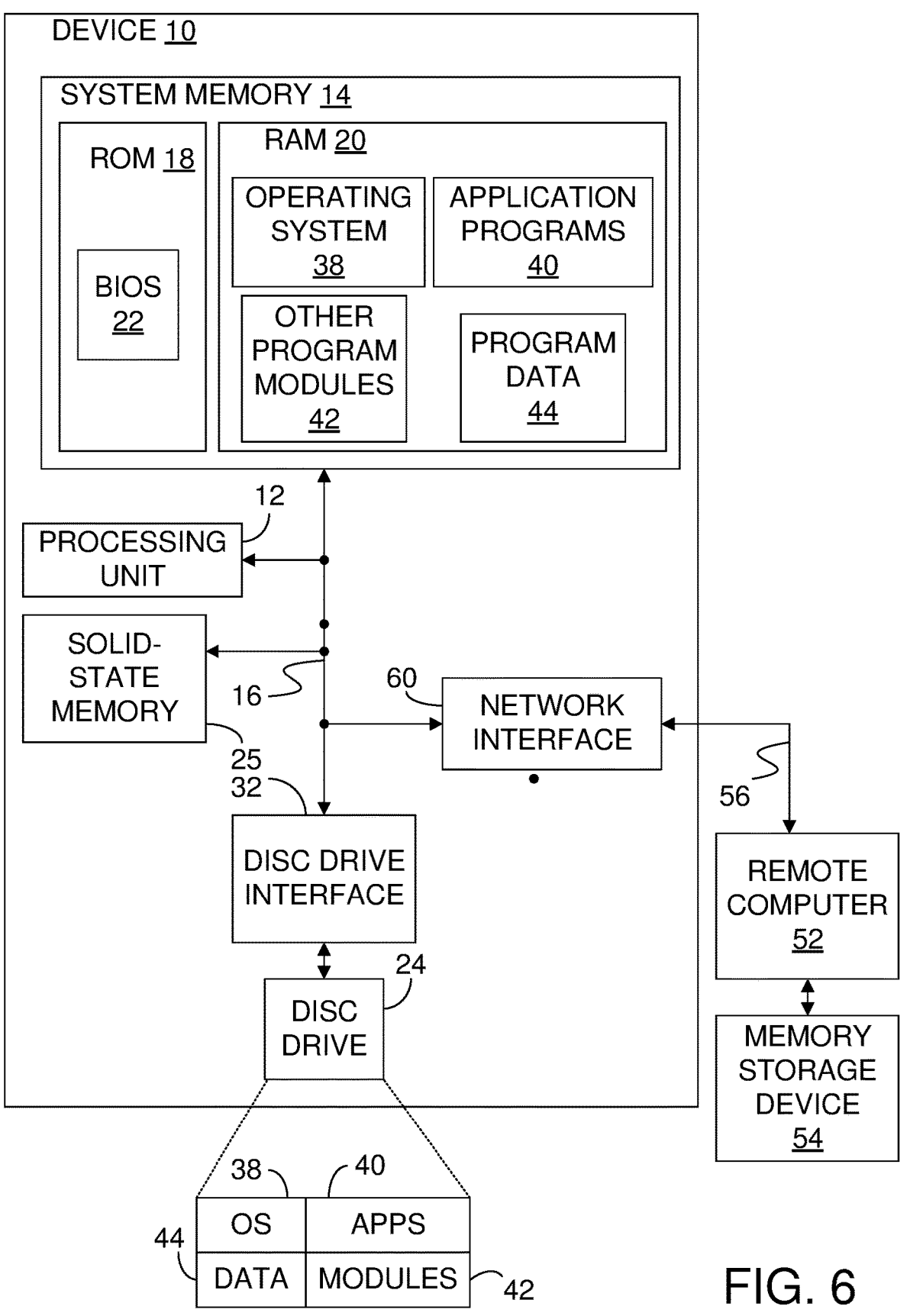
FIG. 6 is a block diagram of a computing device that implements the various embodiments.

FIG. 6 provides an example of a computing device 10 that can be used as deployment server 102, application server 104 or certificate API server 116. Computing device 10 includes a processing unit 12, a system memory 14 and a system bus 16 that couples the system memory 14 to the processing unit 12. System memory 14 includes read only memory (ROM) 18 and random-access memory (RAM) 20.

A basic input/output system 22 (BIOS), containing the basic routines that help to transfer information between elements within the computing device 10, is stored in ROM 18. Computer-executable instructions that are to be executed by processing unit 12 may be stored in random-access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a solid state memory 25 and an optional hard disc drive 24. Hard disc drive 24 is connected to the system bus 16 by a hard disc drive interface 32. The drive and its associated computer-readable media provide nonvolatile storage media for the computing device 10 on which computer-executable instructions and computer-readable data structures may be stored. Other types of media that are readable by a computer may also be used in the exemplary operation environment as non-volatile memory such as solid-state memory.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14, solid state memory 25 and disc drive 24 to perform the methods described above.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 6. The computing device 10 is connected to remote computer 52 through a network interface 60.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 6 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:

receiving, at a computer having a processor, an instruction to deploy software to a server;

in response to the instruction, the computer using an identity of a server cluster of the server to retrieve a setting for the server cluster that designates that a new cryptographic certificate should be requested for the server upon deploying software to the server and based on the retrieved setting, generating a public key/private key pair while preventing the private key from being exposed to any person and automatically requesting the new cryptographic certificate for the server from a second computer, wherein automatically requesting the new cryptographic certificate comprises sending the public key when requesting the new cryptographic certificate;

the second computer providing the new cryptographic certificate to the computer;

the computer providing the new cryptographic certificate to the server; and the computer deploying the software to the server.

2. The method of claim 1 further comprising:

after receiving the new cryptographic certificate, storing the new cryptographic certificate in a secured location that the server can access but that no person can access.

3. The method of claim 2 further comprising:

after storing the new cryptographic certificate, causing the server to access the secured location to retrieve the new cryptographic certificate.

4. The method of claim 3 wherein causing the server to access the secured location comprises causing the server to reboot and request the new cryptographic certificate during startup.

5. The method of claim 1 wherein automatically requesting the new cryptographic certificate comprises determining the last time a new cryptographic certificate was requested and automatically requesting the new cryptographic certificate when the last time is at least a threshold time span from the current time.

6. A system comprising:

a deployment server comprising a processor and memory configured to:

receive an instruction from an entity to deploy software to a server; and in response to the instruction to deploy software, using an identity of a server cluster of the server to retrieve a setting for the server cluster that designates that a new cryptographic certificate should be requested for the server when deploying software to the server and based on the retrieved setting calling an application interface to request the new cryptographic certificate;

an application server comprising a processor and memory configured to execute the application interface to:

receive the request for the new cryptographic certificate; and in response to the request, obtain the new cryptographic certificate through steps comprising generating a public key/private key pair and submitting the public key to a certificate authority without exposing the private key to the entity; and a secure digital vault, configured to receive the new cryptographic certificate, wherein the entity is not allowed to access the secure digital vault and is not allowed access to the new cryptographic certificate.

7. The system of claim 6 wherein the application server obtains the new cryptographic certificate from the certificate authority and creates a certificate file by adding the private key to the new cryptographic certificate.

8. The system of claim 6 wherein before calling the application to request a new cryptographic certificate, determining that a time span since a current cryptographic certificate was created exceeds a threshold.

9. The system of claim 6 wherein the server obtains the new cryptographic certificate and the private key from the secure digital vault.

10. A method comprising:

receiving a request for a cryptographic certificate from a deployment server, wherein the deployment server is configured to deploy software to an application server in response to an instruction from an entity and wherein the deployment server is configured to use an identity of a server cluster of the server to retrieve a setting for the server cluster that designates that the cryptographic certificate should be requested for the server when deploying software to the server and to generate the request for the cryptographic certificate based on the retrieved setting;

obtaining the cryptographic certificate through steps comprising:

generating a public key/private key pair without exposing the private key to the entity; and requesting the cryptographic certificate from a certificate authority; and storing the cryptographic certificate in a secure digital vault that is accessible to the application server without exposing the cryptographic certificate to the entity.

11. The method of claim 10 wherein the request for the cryptographic certificate is generated by the deployment server after determining that a time period since a last cryptographic certificate was requested exceeds a threshold.

12. The method of claim 10 further comprising adding the private key to the cryptographic certificate to form a cryptographic file in the secure digital vault.

* * * * *